United States Patent
Larimer

(10) Patent No.: US 10,964,163 B2
(45) Date of Patent: Mar. 30, 2021

(54) SECURITY AND GAMING DEVICE FOR GAMIFYING DECENTRALIZED DISTRIBUTION OF VIRTUAL TOKENS

(71) Applicant: block.one, Grand Cayman (KY)

(72) Inventor: Daniel J. Larimer, Christianburg, VA (US)

(73) Assignee: block.one, Grand Cayman (KY)

( * ) Notice: Subject to any disclaimer, the term of this patent is extended or adjusted under 35 U.S.C. 154(b) by 0 days.

(21) Appl. No.: 16/383,492

(22) Filed: Apr. 12, 2019

(65) Prior Publication Data
US 2020/0327775 A1 Oct. 15, 2020

(51) Int. Cl.
| | |
|---|---|
| G07F 17/32 | (2006.01) |
| G06Q 20/06 | (2012.01) |
| H04L 9/30 | (2006.01) |
| H04L 29/06 | (2006.01) |

(52) U.S. Cl.
CPC ....... *G07F 17/3244* (2013.01); *G06Q 20/065* (2013.01); *G07F 17/3225* (2013.01); *G07F 17/3241* (2013.01); *G07F 17/3262* (2013.01); *G07F 17/3209* (2013.01); *G07F 17/3211* (2013.01); *H04L 9/30* (2013.01); *H04L 63/0442* (2013.01); *H04L 63/0492* (2013.01)

(58) Field of Classification Search
None
See application file for complete search history.

(56) References Cited

U.S. PATENT DOCUMENTS

| | | | | |
|---|---|---|---|---|
| 2002/0169018 | A1* | 11/2002 | Schneier | G07F 17/3251 463/17 |
| 2003/0008707 | A1* | 1/2003 | Walker | G06Q 30/02 463/25 |
| 2008/0318670 | A1* | 12/2008 | Zinder | G07F 17/3223 463/25 |
| 2010/0010915 | A1 | 1/2010 | Shea | |

(Continued)

FOREIGN PATENT DOCUMENTS

WO 1999-046741 A1 9/1999

OTHER PUBLICATIONS

EPO, International Search Report and Written Opinion with Notification for related International Application No. PCT/US2020/027945 dated Jul. 1, 2020, 8 pgs.

*Primary Examiner* — Damon J Pierce
(74) *Attorney, Agent, or Firm* — McDermott Will & Emery LLP

(57) ABSTRACT

Methods and systems for gamifying decentralized distribution of virtual tokens are provided. The method includes receiving virtual tokens at a security and gaming device, the security and gaming device including storage for securely storing the virtual tokens. The method also includes confirming features of the virtual tokens allow for utilization of the virtual tokens as credits in a game, the game including at least one of a videogame or a game of chance or skill having a result. The method also includes executing the game through an application. The method also includes issuing new tokens through the security and gaming device with each winning result based on an amount of virtual tokens paid for each game. The method also includes destroying the amount of virtual tokens paid for each game with each losing result.

18 Claims, 5 Drawing Sheets

(56) References Cited

U.S. PATENT DOCUMENTS

| | | | |
|---|---|---|---|
| 2013/0065670 A1* | 3/2013 | Michaelson | G07F 17/3244 463/25 |
| 2017/0178237 A1* | 6/2017 | Wong | G06Q 20/065 |
| 2018/0012453 A1* | 1/2018 | Anderson | G07F 17/3267 |
| 2019/0213839 A1* | 7/2019 | Arnone | G07F 17/3269 |

* cited by examiner

SECURITY AND GAMING DEVICE FOR GAMIFYING DECENTRALIZED DISTRIBUTION OF VIRTUAL TOKENS

TECHNICAL FIELD

The present disclosure generally relates to distribution of virtual tokens, and more specifically relates to gamifying distribution of virtual tokens through a security and gaming device.

BACKGROUND

Secure elements, such as hardware security modules (HSMs), form the basis of secure identity verification. These devices allow storage and computation over secret data that is extremely difficult to extract. Each hardware device generates a unique public/private key pair via an on-chip random number generator. The public keys of all devices are hashed into a merkle root. This merkle root is then installed on all devices. From this point on it is possible for all devices to use their unique private key to sign messages which can be validated by all other devices in the set.

SUMMARY

The present disclosure provides for systems and methods for gamifying decentralized distribution of virtual tokens. According to one embodiment of the present disclosure, a computer-implemented method for gamifying distribution of virtual tokens is provided. The method includes receiving virtual tokens at a security and gaming device, the security and gaming device including storage for securely storing the virtual tokens. The method also includes confirming that features of the virtual tokens allow for utilization of the virtual tokens as credits in a game, the game including at least one of a videogame or a game of chance or skill having a result. The method also includes executing the game through an application. The method also includes issuing new tokens through the security and gaming device with each winning result based on an amount of virtual tokens paid for each game. The method also includes destroying the amount of virtual tokens paid for each game with each losing result.

According to one embodiment of the present disclosure, a system is provided that includes means for storing instructions, and means for executing the stored instructions that, when executed by the means, causes the means to perform a method for gamifying decentralized distribution of virtual tokens. The method includes receiving virtual tokens at a security and gaming device, the security and gaming device including storage for securely storing the virtual tokens. The method also includes confirming that features of the virtual tokens allow for utilization of the virtual tokens as credits in a game, the game including at least one of a videogame or a game of chance or skill having a result. The method also includes executing the game through an application. The method also includes issuing new tokens through the security and gaming device with each winning result based on an amount of virtual tokens paid for each game. The method also includes destroying the amount of virtual tokens paid for each game with each losing result.

According to one embodiment of the present disclosure, a system is provided for gamifying decentralized distribution of virtual tokens including a security and gaming device having a memory storing sequences of instructions, and a processor configured to execute the sequences of instructions, which when executed, causes the processor to perform receiving virtual tokens at the security and gaming device to securely store the virtual tokens. The execution of the sequences of instructions also causes the processor to perform confirming that features of the virtual tokens allow for utilization of the virtual tokens as credits in a game, the game including at least one of a videogame or a game of chance or skill having a result. The execution of the sequences of instructions also causes the processor to perform executing the game through an application. The execution of the sequences of instructions also causes the processor to perform issuing new tokens through the security and gaming device with each winning result based on an amount of virtual tokens paid for each game. The execution of the sequences of instructions also causes the processor to perform destroying the amount of virtual tokens paid for each game with each losing result.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
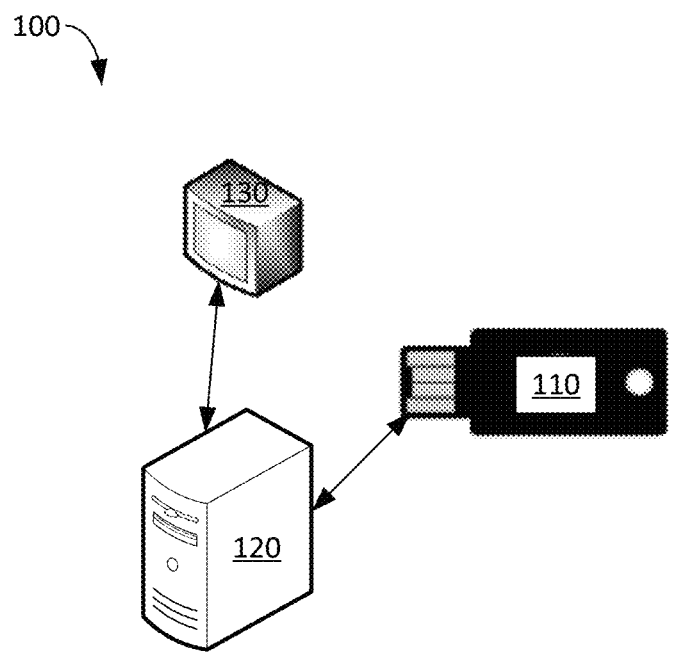
FIG. 1 illustrates an example system architecture for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not as restrictive.

General Overview

Secure elements, such as hardware security modules (HSMs), form the basis of secure identity verification. These devices allow storage and computation over secret data that is extremely difficult to extract. For example, the estimated cost of attacking the hardware is over 1 trillion dollars, which is very unlikely to occur. Each hardware device generates a unique public/private key pair via an on-chip random number generator. The public keys of all devices are hashed into a merkle root. This merkle root is then installed on all devices. From this point on it is possible for all devices to use their unique private key to sign messages which can be validated by all other devices in the set. Given their highly secure nature, it would be desirable to leverage HSMs for the creation and distribution of virtual tokens. For example, virtual tokens may be won in a game of chance or skill and awarded to a player.

As used herein, the term "virtual tokens" includes, but is not limited to, digital poker chips, digital gold, digital currency or coin, digital credits, and the like. Virtual tokens may be private (e.g., maintain privacy of a user's information) and decentralized (e.g., without a central server or central actor).

The disclosed system addresses a problem in traditional virtual token systems, namely the technical problem of customizing distribution of virtual tokens. For example, the rising popularity of digitalization of personal property results in a need for improved techniques for distribution of virtual tokens for various purposes. The disclosed system solves this technical problem by providing a solution also rooted in computer technology, namely, by allowing for distribution of virtual tokens.

The disclosed subject technology further provides improvements to the functioning of the computer itself because it improves the security of the computer and reduces the cost of resources for creating virtual tokens. Specifically, individuals are incentivized to create virtual tokens and utilize those virtual tokens for playing games that reward additional virtual tokens. This overcomes shortcomings associated with current solutions, which rely on publicly accessible databases (e.g., blockchains).

FIG. 1 illustrates an example system architecture 100 for practicing some implementations of the disclosure. The system 100 includes a security device 110 (e.g., a security and gaming device), a computer 120, and a display 130. The security device 110 may include a hardware security module (HSM) such as a YUBIKEY. For example, the security device 110 may include firmware designed to meet HSM and U2F security standards and may be compatible with USB, lightning, and various other types of computer ports. The security device 110 may also be compatible with NFC standards and utilizes solid state memory. The security device 110 may also be programmable.

According to an aspect, the security device 110 may include functionality to track a balance of virtual tokens contained on the security device 110, and allows transfer from one security device 110 to another security device (e.g., a second security and gaming device) using cryptographically signed transactions. For example, the firmware of the security device 110 may include security features and gaming features. The security features may be U2F compatible. The gaming features may include one-player games, such as, including but not limited to, dice, blackjack, or other games with binary or non-binary outcomes. In an implementation, the firmware may be very simple such that the gaming features may be a small add-on to existing U2F firmware in order to minimize avenues for attacking the firmware.

According to an aspect, the security device 110 may implement a game in which user actions, time, and randomness can modify the number of points earned. Everything from games of chance (e.g., dice, slots, etc.) to videogames (e.g., TETRIS), and other non-fungible digital tokens may be implemented. The points earned or lost in the game may result in changes to balances held by the security device 110. These games may be played offline without internet connections. The tokens won or lost may be transferred from the security device 110 to another security device. These games may create a natural utility and therefore market for the tokens.

The security device 110 may generate a unique public/private key pair via an on-chip random number generator. The public keys of all such security devices 110 may be hashed into a merkle root. This merkle root may then be installed on all the security devices 110. From this point on it is possible for all the security devices 110 to use their unique private key to sign messages which can be validated by all other security devices 110 in the set corresponding to the merkle root. The security device 110 may be transferred to other people by updating multi-sig permissions of the security device 110 device before physically transferring it.

In an implementation, rather than using a merkle tree to prove the security device 110 is a member of a trusted group, one or more private keys could be used to sign an attestation of authenticity for the security device 110. For example, the keys utilized for this task may compromise the invariants enforced by the firmware if they were used to endorse a key not governed by the firmware. Another alternative to using a merkle tree may be to create limited edition security devices by destroying attestation keys.

According to an aspect, an owner of the security device 110 may request a transfer to another security device, at which point the firmware will reduce its own balance and then sign a message to instruct the other security device to increase its own balance. In order to prevent replay attacks, the receiver would first generate and store a random one-time-use token. The sender would include the one-time-use token into its signed message. The receiver would then delete the one-time-use token when it processes the incoming transfer message. This protects against replay attacks because only one deposit per one-time-use token may be made. Due to limited memory, the receiver can choose to clear the one-time-use token without accepting a deposit. If the receiver clears the token before processing a message from the sender, then the currency balance may be lost. With such a system tokens can be transferred from device to device without need for the internet, a central database, or a public record. This makes the tokens as secure as cash.

By default, possession of the security device 110 would give the holder access to its balance. Additional security may be implemented by having requests to the security device 110 signed by a weighted threshold multi-sig, including some or all of the following factors: password, physical presence, biometric, signatures from other keys or other devices, and/or time delays from power on. With this process the tokens on the security device 110 can be secured using secure elements in conventional electronic devices (e.g., smartphones, computers, etc.). The combination of a smartphone and the security device 110 can enable timelocks (e.g., GPS time) and geo-fencing as well. With multi-sig it is possible to have multiple ways of accessing the security device 110.

In addition to providing token transfer, it is possible for a user to issue tokens and for games to be played with the tokens. According to an aspect, the security device 110 may store multiple balances with properties defined by a hash. For example, the security device 110 may define a token (e.g., a virtual token), its maximum supply, and parameterized rules of operation. The security device 110 may then issue this token to itself and then transfer the token to other security devices. Each security device 110 may then manage the monetary policy of an unlimited number of tokens. The security device 110 may also store balances for a limited number of tokens at a time.

For maximum security, each security device 110 may be limited to talking to other devices in a same series (e.g., the same merkle tree). Thus, it would not be possible to manufacture new devices after the merkle tree has been calculated and programmed into an existing series of devices. This means each game may have its own limited-edition hardware which itself could become collectable. If demand for holding a token or playing a game grows, then the value of each security device 110 would also grow as well.

The described security device 110 is an improvement to proof-of-work. For example, traditional proof-of-work requires the consumption of electricity and use of large scale ASIC infrastructure. This causes proof-of-work to turn into centralized mining pools which enables censorship. In contrast, the security device 110 enables an improved blockchain architecture that uses proof-of-burn generated by the security device 110 to enable anyone to produce a block, rather than buying tokens, and therefore prevents censorship of transactions. In an implementation, limited edition security devices with a particular game may become collectibles. For example, the limited edition security devices may include limited runs of tokens. The limited edition security devices may also be provided to towns, cities, companies, nonprofits, etc., such that the tokens may be utilized as a medium of exchange and/or a store of value.

According to aspects, the earning of tokens may occur without a central server or central actor (e.g., decentralized). Additionally, both earning and transfer of tokens may occur based on programming of firmware of the security device 110.

Figure 2:
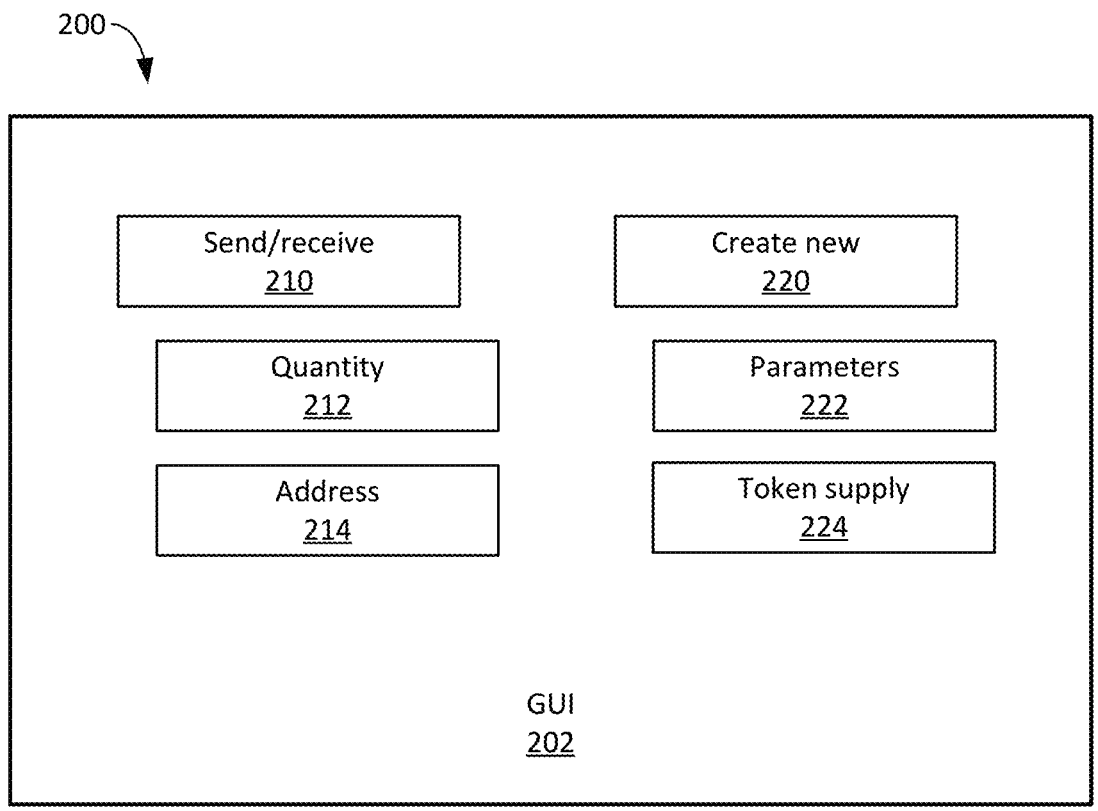
FIG. 2 illustrates an example application interface for decentralized creation and distribution of a virtual token, according to certain aspects of the disclosure.

FIG. 2 illustrates an example application interface 200 for decentralized creation and distribution of a virtual token, according to certain aspects of the disclosure. The application interface 200 may include a GUI 202 that includes options to send/receive a quantity of tokens for an address. For example, a user that wants to send/receive tokens may toggle a send/receive option 210. The user may then designate a quantity of tokens to send/receive through a quantity field 212. The user may also designate an address to either send tokens to or receive tokens from in an address field 214.

The GUI 202 also includes functionality to create a new token and to set parameters for the new token. For example, the user may create their own token by toggling a create new option 220, setting parameters in a parameter field 222, and setting a token supply in a token supply field 224. In this way, an infinite number of currencies (e.g., virtual tokens) can be created, managed, and tracked with the security device. Because the created tokens work outside of any blockchain (e.g., are decentralized, without actions from a central server or central actor), the tokens may be transferred from device to device over an intranet or offline without any other communication. Therefore, transfers have complete privacy (e.g., maintain privacy of user information).

According to an aspect, users can create any number of tokens types on their own security device. The security device may track token types and token balances for each token type. A user may create tokens A, B, and C, and can receive tokens D, E, and F from someone else. Furthermore, all six different token types can be transferred to any other security device. This allows a community to create their own local currency without having to ask for anyone's permission.

According to an aspect, the security device may allocate a globally unique identifier for the new token along with the set of parameters that govern it, including its name, rules (e.g., whether the token allows for gambling), etc., that applies to that particular token. The security device then signs the token description with a key that is tested so that it is known that this is a token configuration that was created by one of the security devices. The token configuration is then given a unique identifier. The unique identifier is then tied to the token's balance, and when any other security device wants to do something with that token, the token description from the security device along with proof of creation from that security device are provided. For example, this ensures that the security devices are from the same hardware line of trusted devices, and from that point on all of the devices will enforce the rules as configured for the token.

According to an aspect, a token may be created that allows gambling with the token. Gambling may work by having the user or an administrator select the odds (e.g., 1 out of 100), and then the security device will generate a random number based on the odds. For example, gambling with the token with odds of 1 out of 100 would yield one in a hundred chance of winning and a 99 in a hundred chance of losing. As a result, the security device would either create new tokens to be stored locally on the security device, or burns the token on the security device. This allows each security device independent from all other devices to play a game of chance or skill with one of these tokens. In an implementation, the new tokens may be rewarded from a set of new tokens that were created ahead of time and only accessible upon winning a game (e.g., a winning result).

According to aspects of the present disclosure, the application interface 200 may be accessed by coupling a security device (e.g., security device 110) to a computer (e.g., computer 120) through a port or wirelessly. Upon being coupled to the computer, firmware on the security device generates the application interface 200 that is displayed on a monitor (e.g., display 130). It is understood that the GUI 202 may include additional functionality in addition to what is illustrated in FIG. 2. In an implementation, the application interface 200 may be accessed directly through the security device 110, such as through a touchscreen interface integrated with the security device 110.

Figure 3:
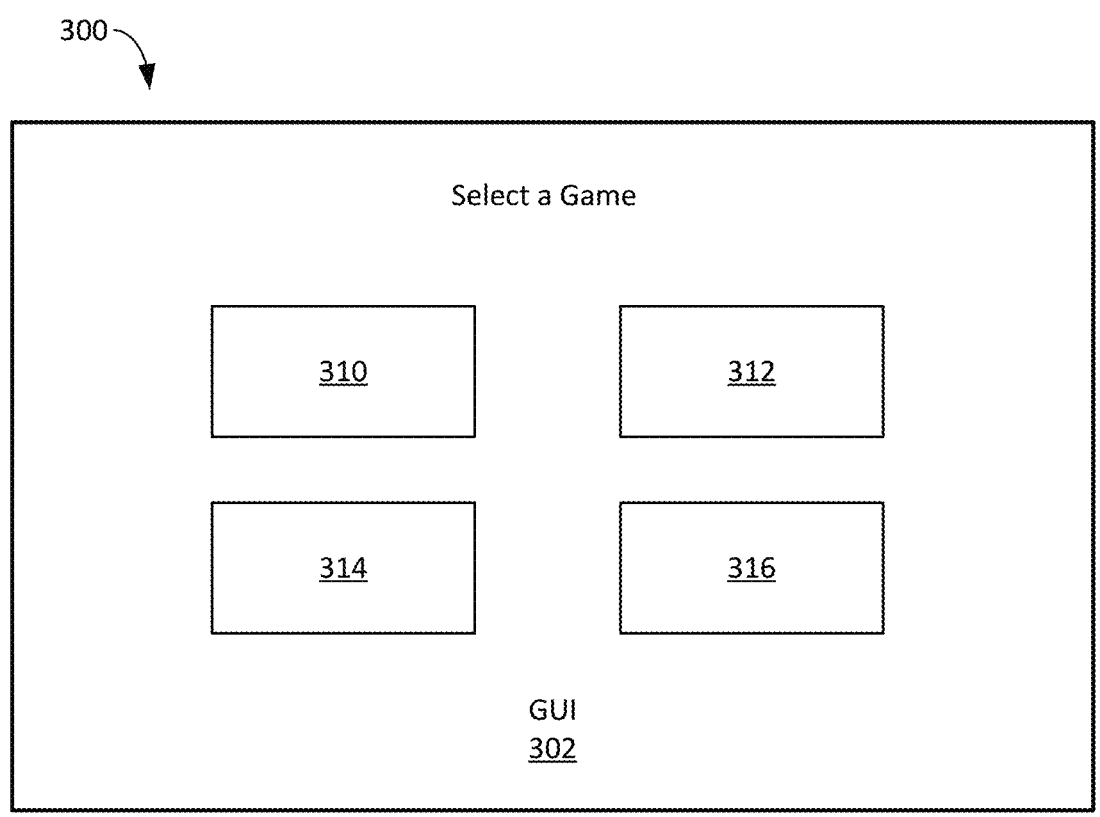
FIG. 3 illustrates an example application interface for playing games with virtual tokens, according to certain aspects of the disclosure.

FIG. 3 illustrates an example application interface 300 for playing games with virtual tokens, according to certain aspects of the disclosure. The application interface 300 may include a GUI 302 having options for selecting various games 310, 312, 314, and 316. For example, each game 310-316 may include games of chance or skill. It is understood that various games may be included.

According to an aspect, the firmware on each security device (e.g., security device 110) may include a one-player game with a binary outcome (e.g., win or loss) or a non-binary outcome. The game may be a game of skill or a game of chance. The firmware will initiate when the security device is plugged into a computer (e.g., computer 120), either physically or using NFC or similar technology. At the outset, prior to initiating the game, no tokens (e.g., virtual tokens) may exist on the security device. Upon initiation of the game, a random number generator may determine a number of tokens from zero to N, where N is set by the programming (e.g., parameters). Once the tokens are generated, the game can be played. Alternatively, the security device may include tokens that allow for gambling, which may be used to play the games.

According to aspects, the games may utilize a random number generator to either double or halve a quantity of tokens on the security device. Another example game includes playing dice against the computer where a high roll wins. If the user rolls the higher number, they receive additional tokens, but rolling a lower number means losing tokens. The number of tokens won or lost may be preprogrammed or determined by the user.

The tokens may exist only on the security device and may be transferred from one security device to another using public key encryption using NFC, the internet, or other possible communication paths. There is no central or decentralized database that keeps track of the number of tokens or ownership of tokens. The original programming (e.g., firmware, parameters) of the tokens may limit the total number of tokens issued in a series by mathematical determinism. The original programming may also ensure deflation by giving the game a mathematical advantage on the odds for each contest such that on balance players would lose more than they win over time, even if individual players may win more than they lose. The tokens may have no inherent value, may not be redeemable with any central authority or issuer, and may be designed strictly for amusement of the player. In an implementation, the tokens may be earned not just for a game, but also for any activity that involves the security device (e.g., security device 110). For example, tokens may be earned for using the security device (e.g., normal use as a hardware key, etc.).

According to aspects of the present disclosure, the application interface 300 may be accessed by coupling a security device (e.g., security device 110) to a computer (e.g., computer 120) either through a port or wirelessly. Upon being coupled to the computer, firmware on the security device generates the application interface 300 that is displayed on a monitor (e.g., display 130). It is understood that the GUI 302 may include additional functionality in addition to what is illustrated in FIG. 3, such as adjusting settings for the games, setting odds, setting betting amounts/limits, selecting a difficulty level, etc. In an implementation, the application interface 300 may be accessed directly through the security device 110, such as through a touchscreen interface integrated with the security device 110.

The disclosed techniques allow for creation of virtual tokens without a public ledger or centralized server, while allowing for privacy and infinite scalability. For example, the virtual tokens created and distributed may be transacted at 10 million transactions per second (tps) with confirmation times of 200 milliseconds, without encountering RAM problems associated with traditional verification procedures. Each user of the device would be their own node. The disclosed techniques provide for transactions to occur without voting or staking of virtual tokens as well. The described virtual tokens may also include fixed functionality, are non-forkable, are truly peer-to-peer, do not have censorship, and may include a massively decentralized and shared database. The virtual tokens may also be order independent, have no global state, have protections against double spending, are initially allocated (e.g., pre-loaded on the device), and may be a limited supply of a digital good. Furthermore, the virtual tokens may be created without account names, without validations for know your customer (KYC) procedures, include public address keys, and include a frequency limit of 2 tps per account. In an implementation, the transferring of tokens may occur directly from security device to security device without a central server or central actor.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or as physical computing device(s) that are specially configured with a combination of hardware and software that causes performance of the method(s).

Figure 4:
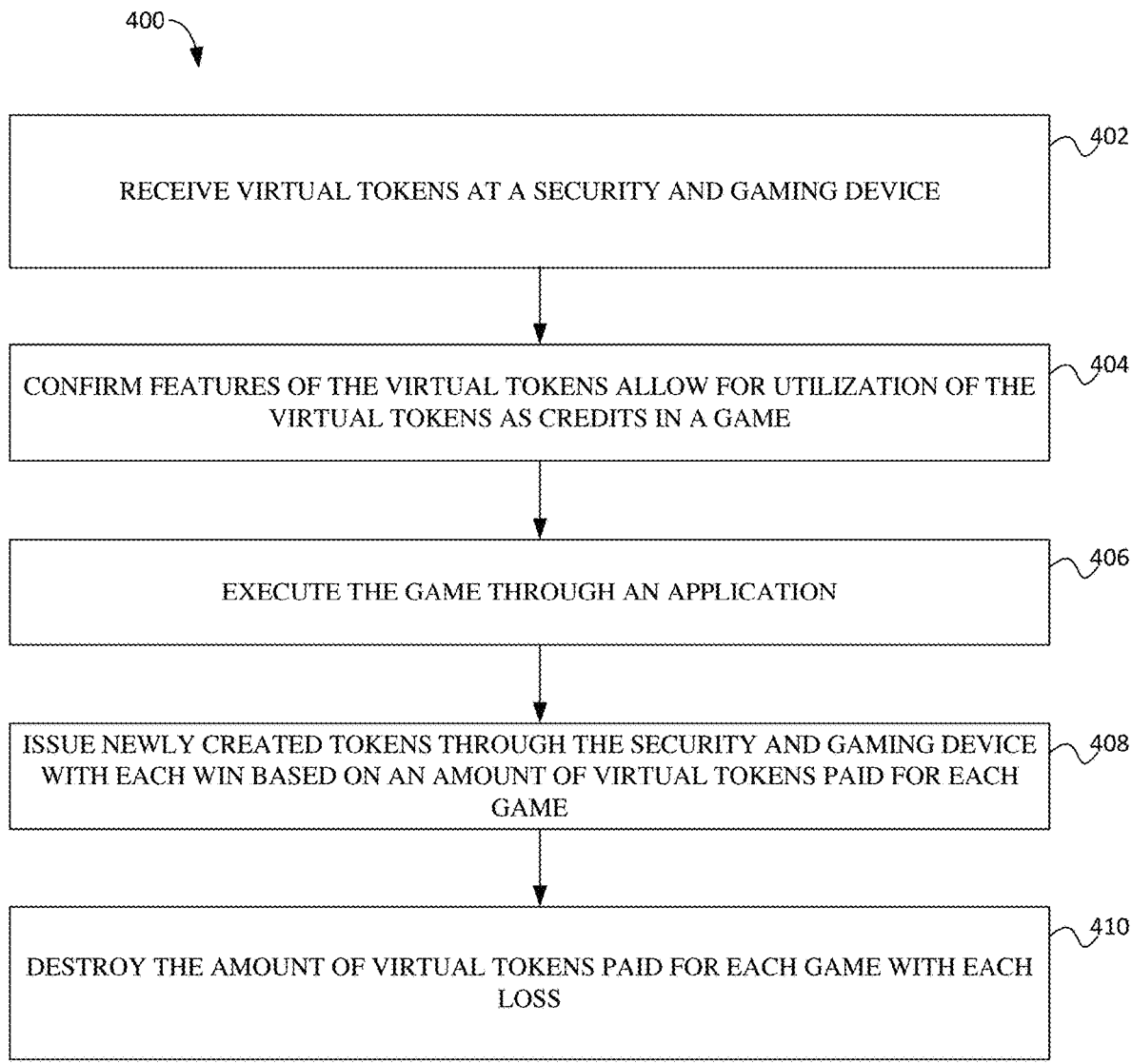
FIG. 4 illustrates an example flow diagram for gamifying decentralized distribution of virtual tokens, according to certain aspects of the disclosure.

FIG. 4 illustrates an example flow diagram (e.g., example process 400) for gamifying decentralized distribution of virtual tokens, according to certain aspects of the disclosure. For explanatory purposes, the example process 400 is described herein with reference to the system 100 of FIG. 1, the application interface 200 of FIG. 2, and the application interface 300 of FIG. 3. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the process 400 will be discussed in reference to FIGS. 1-3.

At step 402, virtual tokens are received at a security and gaming device. The security and gaming device may include storage for securely storing the virtual tokens. At step 404, features of the virtual tokens are confirmed to allow for utilization of the virtual tokens as credits in a game. The game may include at least one of a videogame or a game of chance or skill. The game may have a binary outcome of either a win (e.g., a winning result) or a loss (e.g., a losing result), or otherwise, such as a score or a result. It is understood that the result may be determined by whether the player achieved a certain threshold of satisfactory gameplay, such as through a high score, etc. According to an aspect, if the player does not achieve the threshold, then it may be determined to be a losing result, or otherwise not a winning result. At step 406, the game is executed through an application. At step 408, new tokens are issued through the security and gaming device with each win based on an amount of virtual tokens paid for each game. At step 410, the amount of virtual tokens paid for each game is destroyed with each loss.

According to an aspect, the virtual tokens and the new tokens are received and transferred based on programming of a firmware of the security and gaming device without action from a central server or central actor.

According to an aspect of the present disclosure, the process 400 may further include accessing functionality of the security and gaming device through a user interface. The process 400 may further include selecting the amount of virtual tokens to pay for each game.

According to an aspect of the present disclosure, the process 400 may further include selecting the game of chance or skill through the application, executing the game of chance or skill through the application, generating a random number through hardware of the security and gaming device based on a selected odds, and winning or losing based on the selected odds.

According to an aspect of the present disclosure, the process 400 may further include selecting the videogame through the application, selecting a difficulty level for the videogame, executing the videogame through the application, and winning or losing based on performance in the videogame.

According to an aspect of the present disclosure, the process 400 may further include creating the virtual tokens at another security and gaming device. The process 400 may further include transferring the new tokens to another security and gaming device.

According to an aspect, at step 402, virtual tokens are received at the security device 110 of FIG. 1. The security device 110 may include storage for securely storing the virtual tokens. At step 404, parameters of the virtual tokens are determined to confirm that the virtual tokens are allowed as credits in a game, as discussed above in relation to the application interface 200 of FIG. 2. At step 406, the game is executed through the application interface 300 of FIG. 3. At step 408, new tokens are issued through the security device 110 with each win based on an amount of virtual tokens paid for each game. At step 410, the amount of virtual tokens paid for each game is destroyed with each loss, as discussed above in relation to the application interface 300 of FIG. 3.

Hardware Overview

Figure 5:
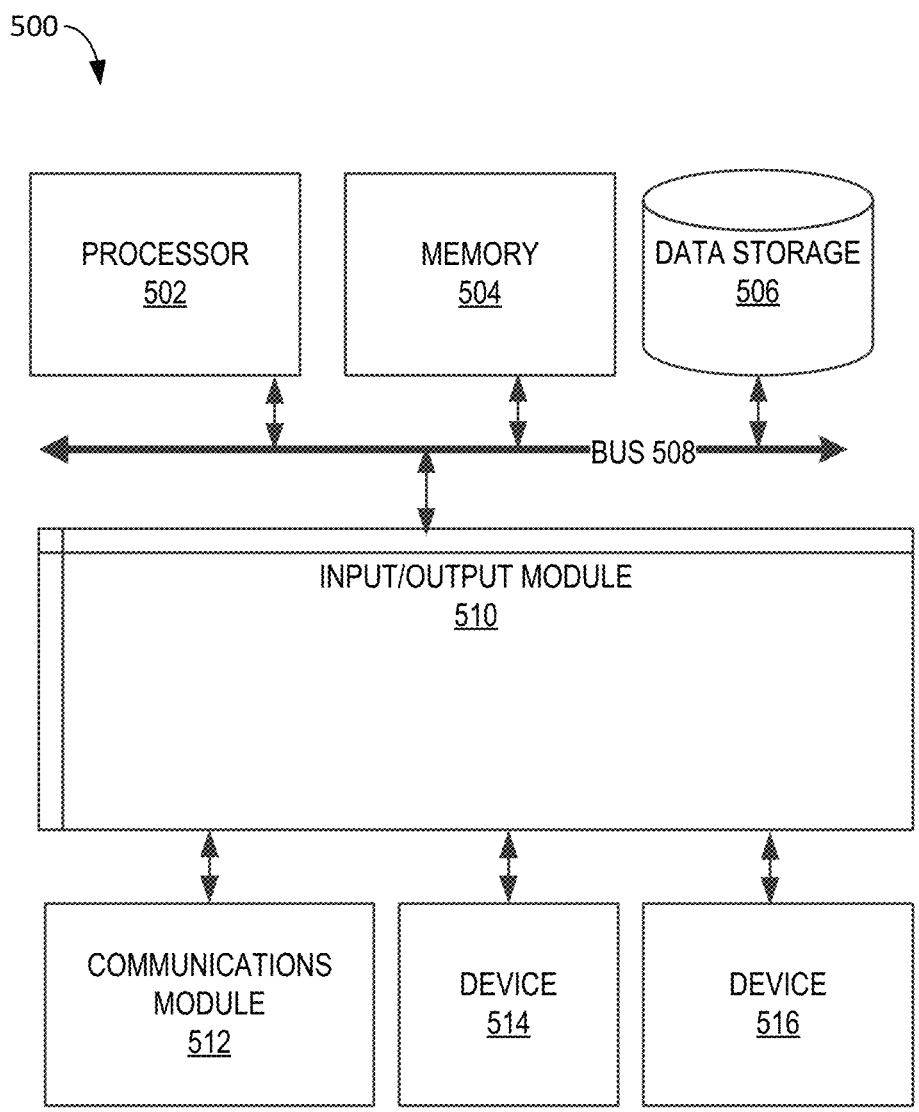
FIG. 5 is a block diagram illustrating an example computer system with which aspects of the subject technology can be implemented.

FIG. 5 is a block diagram illustrating an example computer system 500 with which the system 100 of FIG. 1 may be implemented. In certain aspects, the computer system 500 may be implemented using hardware or a combination of software and hardware, either in a dedicated server, or integrated into another entity, or distributed across multiple entities.

Computer system 500 (e.g., system 100) includes a bus 508 or other communication mechanism for communicating information, and a processor 502 coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 516 may comprise appropriate circuitry for driving the output device 516 to present graphical and other information to a user.

According to one aspect of the present disclosure, the system 100 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example, by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 502 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for gamifying decentralized distribution of virtual tokens, comprising:
   receiving virtual tokens at a security and gaming device, the security and gaming device comprising storage for securely storing the virtual tokens;
   confirming features of the virtual tokens allow for utilization of the virtual tokens as credits in a game, the game comprising at least one of a videogame or a game of chance or skill having a result;
   executing the game through an application;
   issuing new tokens through the security and gaming device with each winning result based on an amount of virtual tokens paid for each game, the new tokens generated ahead of time in accordance with an algorithm and only accessible for issuance upon winning;
   destroying the amount of virtual tokens paid for each game with each losing result; and
   transferring the new tokens to another security and gaming device, the transferring comprising:
      generating a unique public/private key pair for both of the security and gaming devices.

2. The computer-implemented method of claim 1, wherein the virtual tokens and the new tokens are received and transferred based on programming of a firmware of the security and gaming device without action from a central server or central actor.

3. The computer-implemented method of claim 1, further comprising:
   accessing functionality of the security and gaming device through a user interface; and
   selecting the amount of virtual tokens to pay for each game.

4. The computer-implemented method of claim 1, further comprising:
   selecting the game of chance or skill through the application;
   executing the game of chance or skill through the application;
   generating a random number through hardware of the security and gaming device based on a selected odds; and
   winning or losing based on the selected odds.

5. The computer-implemented method of claim 1, further comprising:
   selecting the videogame through the application;
   selecting a difficulty level for the videogame;
   executing the videogame through the application; and
   winning or losing based on performance in the videogame.

6. The computer-implemented method of claim 1, further comprising:
   creating the virtual tokens at another security and gaming device.

7. A system for gamifying decentralized distribution of virtual tokens, comprising:
   a security and gaming device comprising memory, the memory storing sequences of instructions; and
   a processor configured to execute the sequences of instructions which, when executed, causes the processor to perform:
      receiving virtual tokens at the security and gaming device to securely store the virtual tokens;

confirming features of the virtual tokens allow for utilization of the virtual tokens as credits in a game, the game comprising at least one of a videogame or a game of chance or skill having a result;

executing the game through an application;

issuing new tokens through the security and gaming device with each winning result based on an amount of virtual tokens paid for each game, the new tokens generated ahead of time in accordance with an algorithm and only accessible for issuance upon winning;

destroying the amount of virtual tokens paid for each game with each losing result; and transferring the new tokens to another security and gaming device, the transferring comprising:

generating a unique public/private key pair for both of the security and gaming devices.

8. The system of claim 7, wherein the virtual tokens and the new tokens are received and transferred based on programming of a firmware of the security and gaming device without action from a central server or central actor.

9. The system of claim 7, further comprising stored sequences of instructions, which when executed by the processor, cause the processor to perform:

accessing functionality of the security and gaming device through a user interface; and selecting the amount of virtual tokens to pay for each game.

10. The system of claim 7, further comprising stored sequences of instructions, which when executed by the processor, cause the processor to perform:

selecting the game of chance or skill through the application;

executing the game of chance or skill through the application;

generating a random number through hardware of the security and gaming device based on a selected odds; and winning or losing based on the selected odds.

11. The system of claim 7, further comprising stored sequences of instructions, which when executed by the processor, cause the processor to perform:

selecting the videogame through the application;

selecting a difficulty level for the videogame;

executing the videogame through the application; and winning or losing based on performance in the videogame.

12. The system of claim 7, further comprising stored sequences of instructions, which when executed by the processor, cause the processor to perform:

creating the virtual tokens at another security and gaming device.

13. A non-transitory computer-readable storage medium is provided including instructions that, when executed by a processor, cause the processor to perform a method for gamifying decentralized distribution of virtual tokens, the method comprising:

receiving virtual tokens at a security and gaming device, the security and gaming device comprising storage for securely storing the virtual tokens;

confirming features of the virtual tokens allow for utilization of the virtual tokens as credits in a game, the game comprising at least one of a videogame or a game of chance or skill having a result;

executing the game through an application;

issuing new tokens through the security and gaming device with each winning result based on an amount of virtual tokens paid for each game, the new tokens generated ahead of time in accordance with an algorithm and only accessible for issuance upon winning;

destroying the amount of virtual tokens paid for each game with each losing result; and transferring the new tokens to another security and gaming device, the transferring comprising:

generating a unique public/private key pair for both of the security and gaming devices.

14. The non-transitory computer-readable storage medium of claim 13, wherein the virtual tokens and the new tokens are received and transferred based on programming of a firmware of the security and gaming device without action from a central server or central actor.

15. The non-transitory computer-readable storage medium of claim 13, wherein the method further comprises:

accessing functionality of the security and gaming device through a user interface; and selecting the amount of virtual tokens to pay for each game.

16. The non-transitory computer-readable storage medium of claim 13, wherein the method further comprises:

selecting the game of chance or skill through the application;

executing the game of chance or skill through the application;

generating a random number through hardware of the security and gaming device based on a selected odds; and winning or losing based on the selected odds.

17. The non-transitory computer-readable storage medium of claim 13, wherein the method further comprises:

selecting the videogame through the application;

selecting a difficulty level for the videogame;

executing the videogame through the application; and winning or losing based on performance in the videogame.

18. The non-transitory computer-readable storage medium of claim 13, wherein the method further comprises:

creating the virtual tokens at another security and gaming device.

* * * * *